(12) United States Patent
Kiester et al.

(10) Patent No.: US 7,125,062 B2
(45) Date of Patent: Oct. 24, 2006

(54) MULTI-FUNCTIONAL CARGO BED ASSEMBLY

(75) Inventors: Lowell Kiester, Bloomfield Hills, MI (US); Douglas Street, Royal Oak, MI (US)

(73) Assignee: Projx, Inc., Madison Heights, MI (US)

( * ) Notice: Subject to any disclaimer, the term of this patent is extended or adjusted under 35 U.S.C. 154(b) by 33 days.

(21) Appl. No.: 10/793,688

(22) Filed: Mar. 4, 2004

(65) Prior Publication Data

US 2005/0194816 A1 Sep. 8, 2005

(51) Int. Cl.
*B60N 3/12* (2006.01)

(52) U.S. Cl. .................. 296/37.6; 16/290; 220/263; 220/830; 224/498

(58) Field of Classification Search .............. 296/37.6, 296/24.4, 39.1, 39.2; 224/492, 498; 248/686, 248/205.1, 207; 16/289, 290, 282, 285; 220/263, 220/827, 830
See application file for complete search history.

(56) References Cited

U.S. PATENT DOCUMENTS

| | | |
|---|---|---|
| 3,464,369 A | 9/1969 | Erickson et al. |
| 3,680,492 A | 8/1972 | Weage |
| 3,767,059 A | 10/1973 | Seiz |
| RE28,788 E | 4/1976 | Williamson, III |
| 4,585,265 A | 4/1986 | Mader |
| 4,629,390 A | 12/1986 | Burke |
| 4,705,317 A | 11/1987 | Henri |
| 4,722,646 A | 2/1988 | McIntyre |
| 4,733,899 A | 3/1988 | Keys |
| 4,834,599 A | 5/1989 | Gordon et al. |
| 4,909,558 A | 3/1990 | Roshinsky |
| 5,044,682 A | 9/1991 | Wayne |
| 5,167,434 A | 12/1992 | Bott |
| D336,062 S | 6/1993 | Austin |
| 5,259,712 A | 11/1993 | Wayne |
| 5,265,993 A | 11/1993 | Wayne |
| 5,411,355 A | 5/1995 | Gosnell et al. |
| 5,415,506 A | 5/1995 | Payne |
| 5,423,463 A | 6/1995 | Weeks |
| 5,427,486 A | 6/1995 | Green |
| 5,443,160 A | 8/1995 | Tortorella et al. |
| 5,443,586 A | 8/1995 | Cargill |
| 5,456,511 A | 10/1995 | Webber |
| 5,456,514 A | 10/1995 | Justice |
| 5,564,767 A | 10/1996 | Strepek |
| 5,586,850 A | 12/1996 | Johnson |
| 5,603,439 A | 2/1997 | Pineda |
| 5,628,442 A | 5/1997 | Wayne |
| 5,669,654 A | 9/1997 | Eilers et al. |
| 5,720,507 A | 2/1998 | Emery |

(Continued)

FOREIGN PATENT DOCUMENTS

WO    WO 91/17066    11/1991

*Primary Examiner*—Lori L. Coletta
(74) *Attorney, Agent, or Firm*—Harness, Dickey & Pierce, P.L.C.

(57) ABSTRACT

A multi-functional cargo area assembly for a cargo bed of a vehicle includes a first and a second sidewall disposed in a transversely spaced relationship, and an integrally formed guide track in the first and second sidewalls. The cargo area assembly also includes extendible sidewall portions. The cargo area assembly further includes a movable divider panel supported with the guide track by a support rod, and extending transversely between the first and second sidewalls, wherein the divider panel includes a positioning mechanism for fixedly locating the divider panel.

8 Claims, 15 Drawing Sheets

U.S. PATENT DOCUMENTS

| | | |
|---|---|---|
| 5,746,025 A | 5/1998 | Shimura |
| 5,816,637 A | 10/1998 | Adams et al. |
| 5,845,953 A | 12/1998 | Rusnock |
| 5,924,615 A * | 7/1999 | McGarrah ............ 296/37.6 |
| 5,924,753 A | 7/1999 | DiBassie |
| 5,927,783 A | 7/1999 | Baka |
| 5,938,262 A | 8/1999 | Mills |
| 6,015,178 A | 1/2000 | Haack |
| 6,050,628 A | 4/2000 | Allison et al. |
| 6,176,406 B1 | 1/2001 | Laumann |
| 6,186,575 B1 | 2/2001 | Fisher et al. |
| 6,237,211 B1 | 5/2001 | Clare et al. |
| 6,367,858 B1 | 4/2002 | Bradford |
| 6,517,137 B1 | 2/2003 | Kiester et al. |
| 6,601,899 B1 | 8/2003 | Kiester et al. |
| 6,733,060 B1 * | 5/2004 | Pavkov et al. .......... 296/37.16 |
| 6,913,304 B1 * | 7/2005 | Sweet .................. 296/37.6 |

\* cited by examiner

MULTI-FUNCTIONAL CARGO BED ASSEMBLY

FIELD OF THE INVENTION

The present invention relates generally to a cargo bed for a vehicle, such as a pickup truck or a sport utility. More specifically, the invention relates to a multi-functional cargo bed assembly for the cargo bed portion of a vehicle, which functions to extend the length of the cargo bed and includes an infinitely positionable divider panel.

BACKGROUND OF THE INVENTION

Utility vehicles, such as pickup trucks and cargo vans are characterized by a load carrying portion, referred to as a cargo bed, defined by a generally planar floor. The dimensions of the cargo bed vary in length from several feet to more than eight feet. These types of vehicles are multifunctional, since they satisfy both transportation and load carrying capacity needs.

Various devices are available to further increase the versatility of the utility vehicle, and in particular the cargo bed portion. One example of such a device is a cargo bed cover for enclosing the cargo bed of a pickup truck. Another example is a removable cargo bed liner, which is configured with the shape of the cargo bed, to protect the surface finish of the cargo bed. Still another example is a cargo bed divider, for subdividing the cargo bed of the pickup truck to accommodate diverse, or various sized, loads. The prior art has implemented a number of different approaches towards providing cargo bed dividers for pickup trucks. Some prior art dividers are shown in U.S. Pat. Nos. 5,411,355; 4,722,646; 5,603,439; 5,456,514; 5,423,463; 5,415,506; 3,767,059; 5,044,682; 4,733,899; 5,265,993; 5,586,850; 5,628,442; 5,845,953; 4,834,599; 5,259,712 and 5,927,783. At the same time, it is also advantageous to expand the volume of the cargo bed of a pickup truck to accommodate an oversized load, such as a 4×8' sheet of plywood.

While various of the prior art cargo bed liners and divider systems referenced herein are reconfigurable, none of these systems allow for the expansion of the interior volume of a pickup truck's cargo bed. Thus, there is a need in the art for a multi-functional cargo bed liner assembly that is expandable and includes a divider panel that is infinitely positionable.

SUMMARY OF THE INVENTION

Accordingly, the present invention is a multi-functional cargo area assembly for a cargo bed of a vehicle. The cargo area assembly includes a first and a second sidewall disposed in a transversely spaced relationship, and an integral guide track formed in the first and second sidewalls. The cargo area assembly also includes an end wall extending between the first and second sidewall at a first end, and a floor extending between the first and second sidewalls. The sidewall panels are mounted to mounting brackets that simplify the mounting of the sidewall. The cargo area assembly further includes a movable divider panel supported within the track by a support means, and extending transversely between the first and second sidewalls, wherein the divider panel includes a positioning mechanism for fixedly locating the divider panel. The track includes a pivoting portion that pivots open to receive the roller/pinion of the divider panel.

One advantage of the present invention is that the sidewalls include an easily accessible storage bin having a lid uniquely hinged to the storage bin. The storage bins of the cargo area are provided with a drain plug to allow the storage bins to be filled with fluid and/or used as a cooler which can be easily drained by release of the drain plug. Still a further advantage of the present invention is that the sidewall includes an integrated track for repositioning the divider panel.

Other advantages and features of the present invention will be readily appreciated as the same becomes better understood after reading the subsequent description when taken in conjunction with the accompanying drawings.

DETAILED DESCRIPTION OF THE INVENTION

Figure 1:
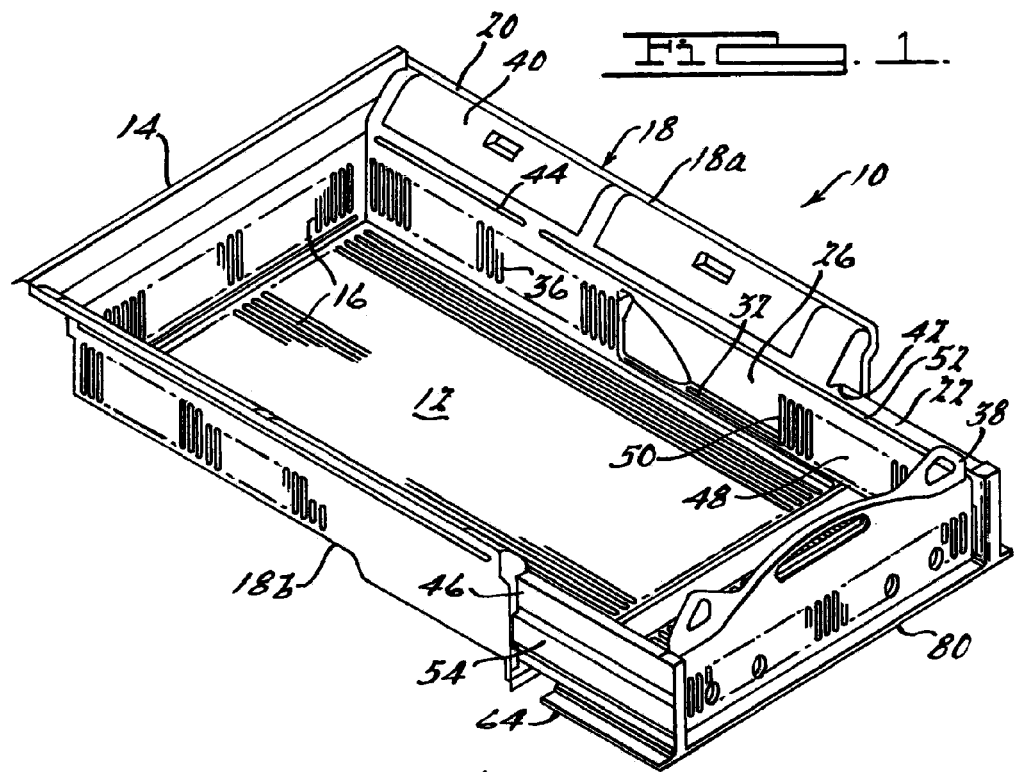
FIG. 1 is a perspective view of a multi-functional cargo bed liner assembly with a sidewall fully extended, according to the present invention.

The multi-functional cargo bed assembly 10 of the present invention is operable to subdivide the cargo bed of a utility vehicle, such as a pickup truck, into a number of separate areas. It is further operable to extend out onto the lowered gate of a pickup truck to expand the volume of the cargo bed. Most preferably, the extension sections and divider panel fully enclose the sides of the cargo bed when the panel is extended out onto the lowered tailgate.

Referring to FIG. 1–7, a multi-functional cargo bed liner assembly 10 for the cargo bed portion of a vehicle (not shown), which in this example is a pickup truck, is illustrated. The cargo bed liner assembly 10 has a general box-like shape. The cargo bed liner assembly 10 includes a generally planar floor portion 12, forming the floor of the cargo bed liner 10. The cargo bed liner assembly 10 also includes an end wall 14 extending from an end of the floor 12, adjacent the cab of the vehicle. Preferably, both the floor 12 and end wall 14 include a plurality of integrally formed ribs 16. The ribs 16 are spaced a predetermined distance apart, and extend longitudinally. Advantageously, the ribs 16 provide structural support to the floor 12 and end wall 14, respectively.

The cargo bed liner assembly 10 further includes a sidewall 18 extending upwardly from a side edge of the floor 12. In this example, the cargo bed liner assembly includes a first sidewall 18a disposed in a transversely spaced relationship with a second sidewall 18b. The sidewall 18 includes a fixed sidewall 20 with a side extension wall 22 slidably attached to the fixed sidewall 20. It should be appreciated that the fixed sidewall 20 is generally planar, and a first side edge of the fixed sidewall 20 is adjacent to the end wall 14, and a second side edge of the fixed sidewall is unattached, as shown at 24. The fixed sidewall 20 and side extension wall 22 may include an integrally formed feature as shown at 26 such as a depression or boss or the like. In particular, the integrally formed feature 26 enables the cargo bed liner assembly 10 to conform with the shape of the cargo bed portion of the vehicle.

Figure 6:
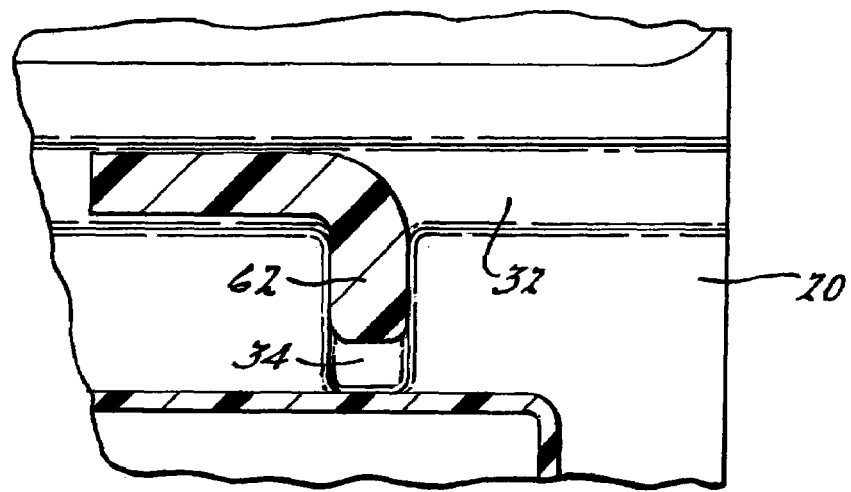
FIG. 6 is an elevational view taken along lines 6—6 of FIG. 2 of the locking mechanism locking tab within the locking groove, according to the present invention.
Figure 7:
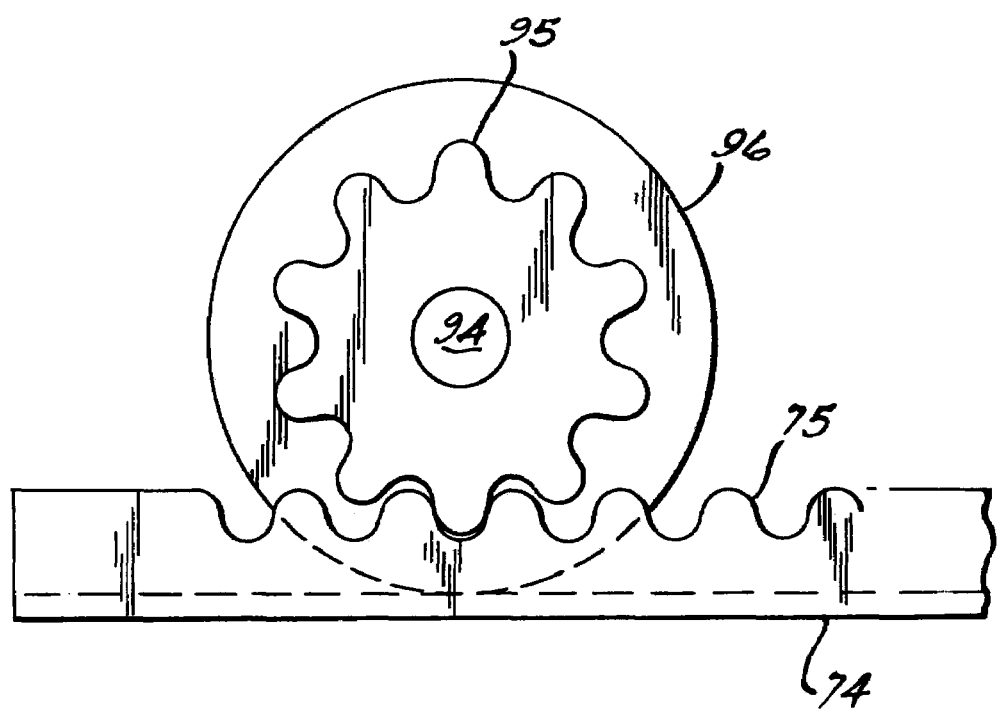
FIG. 7 is an elevational cutaway view taken along line 7—7 of FIG. 2 of the wheel and gear track, according to the present invention.

In this example, the unattached edge 24 of the fixed sidewall 20 includes an integrally formed depression having a rectangular shape, as shown at 28, to provide access to a positioning mechanism 30, for positioning the side extension wall 22 with respect to the fixed sidewall 20 in a manner to be described. A lower portion of the fixed sidewall 20 includes an integrally formed groove extending longitudinally, to provide a lower track 32 for slidably positioning the side extension wall 22. Preferably, the length of the lower track 32 corresponds to the distance of travel required for the side extension wall 22. As shown in FIG. 6, the lower track 32 also includes a portion extending radially a predetermined distance from the lower track 32 to form a locking groove 34, for locking the side extension wall 22 in a desired position, in a manner to be described.

A lower portion of the fixed sidewall 20 includes a plurality of integrally formed, vertically extending indexing grooves 36 spaced a predetermined distance apart, extending longitudinally there along the fixed sidewall 20 a predetermined length, for indexing the position of a divider panel 38 of the cargo bed liner assembly 10, in a manner to be described. In this example, the lower portion of the fixed sidewall 20 includes a plurality of indexing grooves 36, and a recess 26 that conforms with the shape of the wheel well portion of the cargo bed. Also in this example, an upper portion of the fixed sidewall 20 includes an integrally formed storage box 40 having a cover, for storing items within. In addition, a lower edge of the upper portion of the fixed sidewall 20 forms a lip, to provide an upper track 42 for guiding the movement of the side extension wall 22. The fixed sidewall 20 also includes a slot 44 extending longitudinally between the upper portion and lower portion of the fixed sidewall 20, to provide access to a track for the divider panel 38.

Advantageously, the side extension wall 22 increases the overall length of the cargo bed of the vehicle. It is contemplated that the side extension wall 22 may be a single panel, or an assembly. In this example, the side extension wall 22 is an assembly and includes an inner panel 46 joined to an outer panel, 48 to form a unitary wall, having a box-like shape. The outer panel 48 is a generally planar member. The outer panel 48 includes a lower flange 48a extending from lower portion of the outer panel 48 to form a lower guide for the side extension wall in the lower track 32 in the fixed sidewall 20. The outer panel 48 also includes an upper flange 48b extending from an upper edge of the outer panel 48, to form an upper guide for the side extension wall 22 with respect to the upper track 42 formed in the fixed sidewall 22.

A lower portion of the outer panel 48 further includes a plurality of vertically extending indexing grooves 50 spaced a predetermined distance apart, similar to the grooves 36 in the fixed sidewall 20, for positioning the divider panel 38. The outer panel 48 further includes a longitudinally extending slot shown at 52 positioned above the indexing grooves 50 in the outer panel 48. It should be appreciated that the slot 44 in the fixed sidewall 20 and slot 52 in the outer panel 48 form a single slot, to allow unencumbered travel of the divider panel 38. The outer panel 48 may include a cutaway portion (not shown) at en end of the slot 52, for removing the divider panel 38 from the cargo bed liner assembly 10.

The inner panel 46 is also a generally planar member. In this example, the inner panel 46 includes a longitudinally extending channel shown at 54 having a box-like shape. Advantageously, the inner panel 46 and outer panel 48 can be formed and joined as one using a conventional technique, such as blow molding.

The floor 12 in fixed sidewall portions 20 can be formed as a unitary member and the front wall section can also be integrally formed therewith or formed as a separate panel.

Figure 5:
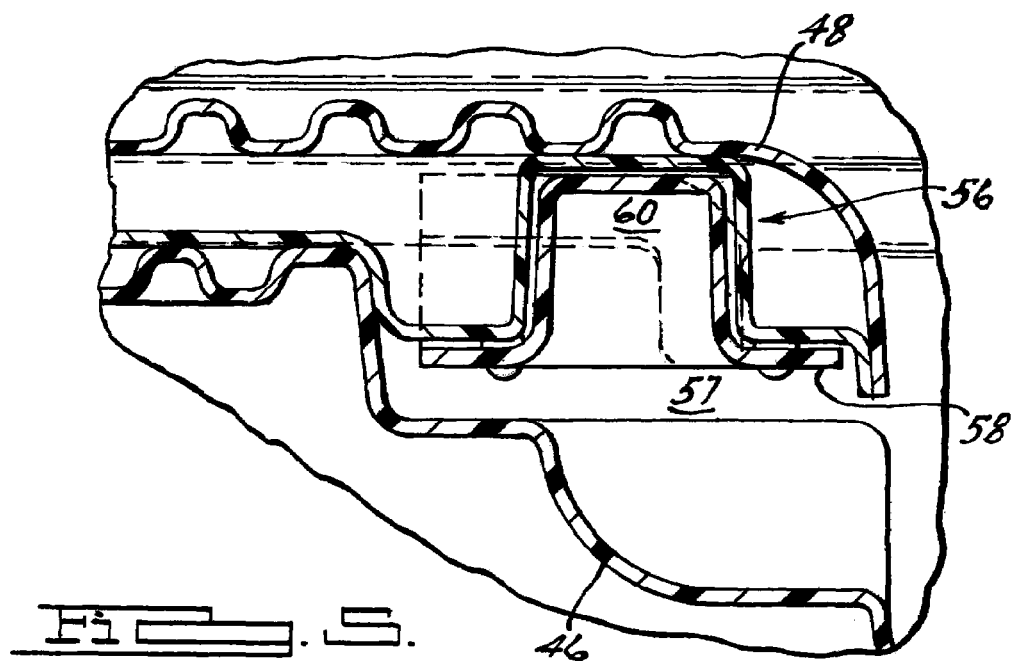
FIG. 5 is an elevational cutaway view taken along lines 5—5 of FIG. 2 of the locking mechanism, according to the present invention.

Referring to FIGS. 5–6, the side extension panel further includes a locking mechanism 56, for retaining the side extension wall 22 in a fixed position relative to the fixed sidewall 20. The locking mechanism 56 is slidably disposed between the inner panel 46 and outer panel 48 of the side extension wall 22. Preferably, an outer edge of the outer panel includes a recess, shown at 57, to provide the operator access to the locking mechanism 56. In this example, the locking mechanism includes a handle 58 for actuating the locking mechanism 56 to position the side extension wall 22 with respect to the fixed sidewall 20. The handle 58 includes a generally planar face, with a rectangular recess shown at 60, for receiving the fingers of the operator in locking and unlocking the side extension panel. A lower portion of the handle 58 includes an integrally formed locking tab 62 having an "L" shape. The locking mechanism 56 further includes a biasing spring (not shown), such as an extension spring disposed in a recess (not shown) formed above the handle 58. Preferably, the spring is secured at one end to the handle 58 and at the other end to the side extension wall 22, to bias the handle in a locked position.

The cargo bed liner assembly 10 includes a tailgate panel 64 fixedly attached to the tailgate (not shown) of the vehicle using a conventional fastener, such as a screw. The tailgate panel 64 is a generally planar member, and includes a plurality of integrally formed ribs 66 spaced a predetermined distance apart, to provide structural support to the tailgate panel 64. The tailgate panel 64 also includes an integrally formed groove forming a track 68 for positioning the side extension wall 22 relative to the fixed wall. The groove has an "L" shape, with the smaller leg forming a locking groove as shown at 70, and similar to the locking groove 34 for receiving the locking tab 62 of the locking mechanism for retaining the side extension wall 22 in a fully extended position.

To operate the locking mechanism 56, the operator grips the handle 58 by placing the fingers in the recessed area 60 of the handle 58, and raises the handle 58 to overcome the force of the biasing spring to disengage the locking tab 62 from either the locking groove in the fixed sidewall 20 or tailgate panel 64. It should be appreciated that the force of the biasing spring on the handle 58 retains the locking tab 62 in the preferred locking groove 34 or 70. Then, the operator slidably extends or retracts the side extension wall 22 to a predetermined position, aligns the locking tab 22 with the locking groove 34, 70 and releases the handle 58 so that the force of the spring retains the locking tab 62 in the locking groove 34, 70. In this example, the predetermined position is either at the end of the tailgate panel 64, or at the end of the fixed sidewall 20. It should be appreciated that the side extension wall 22 effectively extends the length of the sides of the vehicle.

Figure 3:
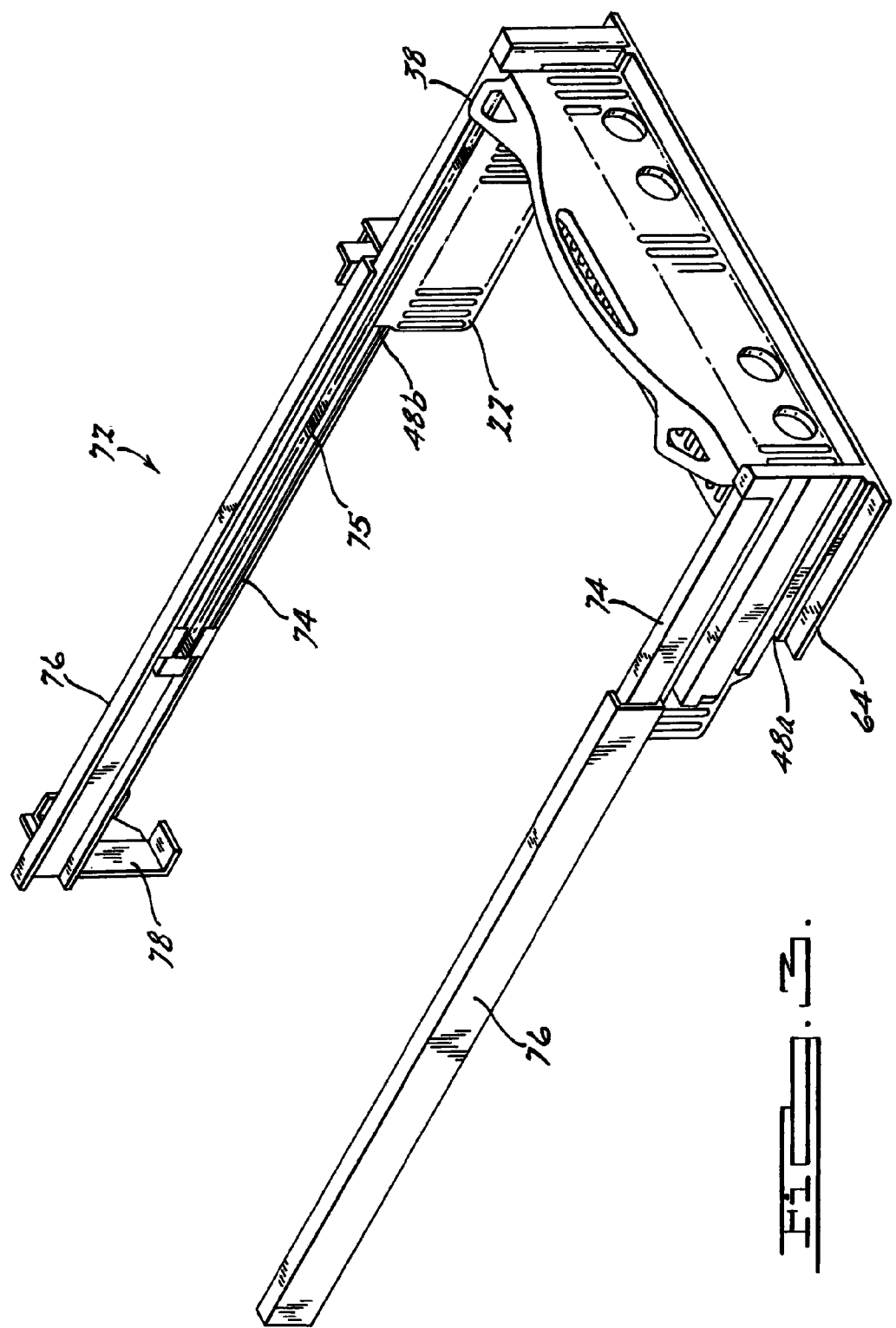
FIG. 3 is a perspective view of a frame for supporting the cargo bed liner assembly of FIG. 1, according to the present invention.

As shown in FIG. 3, the cargo bed liner assembly 10 includes a frame 72 for supporting the cargo bed liner assembly 10. The frame 72 includes an inner track 74 slidably disposed within an outer track 76 and supported by legs 78. Preferably, the legs 78 are mounted to the vehicle using a conventional fastening means, such as a bolt or screw. In this example, the inner track 74 has a "C" shape and the outer track 76 has a "U" shape. The inner track 74 and outer track 76 can be extruded from a material such as steel or plastic. The frame 72 extends along the length of the sidewall 18. Preferably, the inner track 74 includes a gear track 75 disposed therein for indexing the travel of the divider panel 38 in the inner track 74. In this example, the gear track 75 includes a plurality of tooth-shaped members, as is known in the art, although other types of gear tracks 75 are contemplated. The sidewall 18 is attached to the frame 72 using a conventional fastening mechanism, such as a bolt. In this example, the fixed sidewall 20 is securely mounted to the outer track 76, and the side extension wall 22 is securely mounted to the inner track 74. Preferably, the height of the legs is selected so that the inner track 74 and outer track 76 are accessible through the slot 44, 52 extending therethrough the fixed sidewall 20 and side extension wall 22.

Preferably, the frame 72 is disposed inboard of the wheel well (not shown) of the vehicle. This mechanical arrangement is not necessary; however, by so disposing the frame 72, it is assured that the divider panel 38 will clear the wheel well without the need to have any type of cutout or the like which could compromise its integrity.

Figure 2:
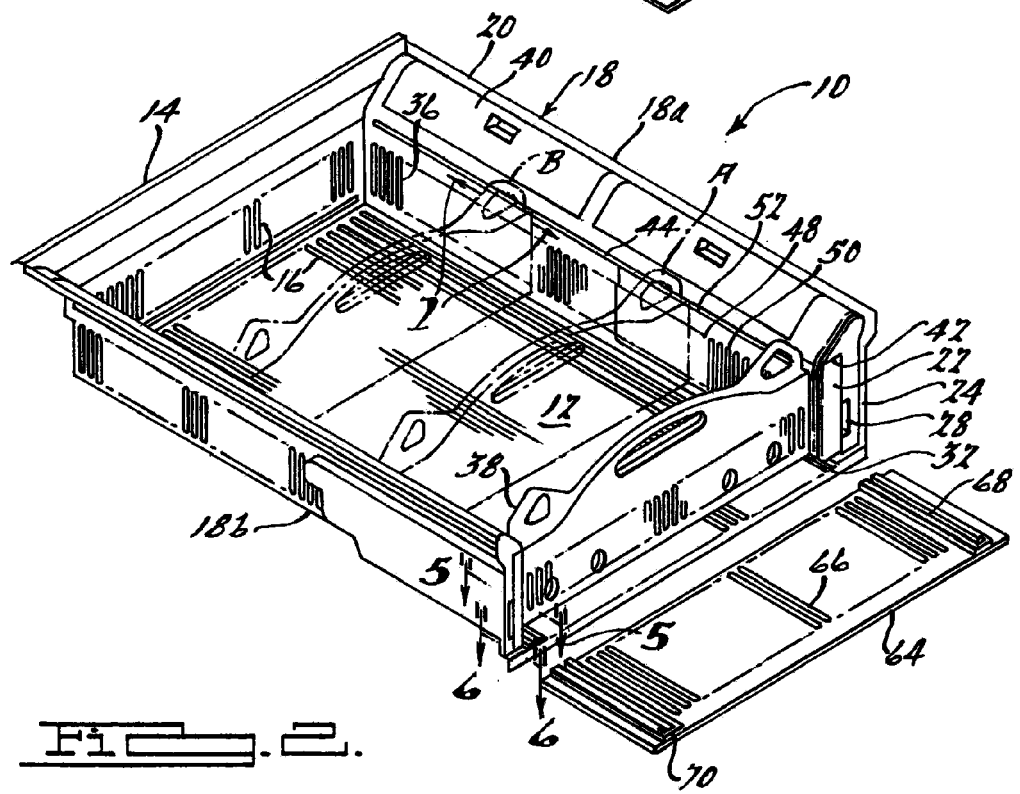
FIG. 2 is a perspective view of the cargo bed liner assembly of FIG. 1, showing the sidewall retracted and the divider system in a number of alternative positions, according to the present invention.

The cargo bed liner assembly 10 includes a divider panel 38 that can be moved along the inner track 74 to a number of different positions, so as to permit the cargo bed to be subdivided into separate areas. As illustrated in FIG. 2, the panel 38 is shown in a first position A and a second position B, also within the cargo bed, as shown in phantom outline. In addition, the panel 38 can be moved atop the lowered tailgate, as shown in FIG. 1 at 80. Advantageously, when the divider panel 38 is in the position shown at 80 with the side extension wall 22 fully extended, the effective length of the cargo bed is increased. Further, the divider panel 38 can be removed from the cargo bed assembly 10 through the cut-away portion.

Figure 4:
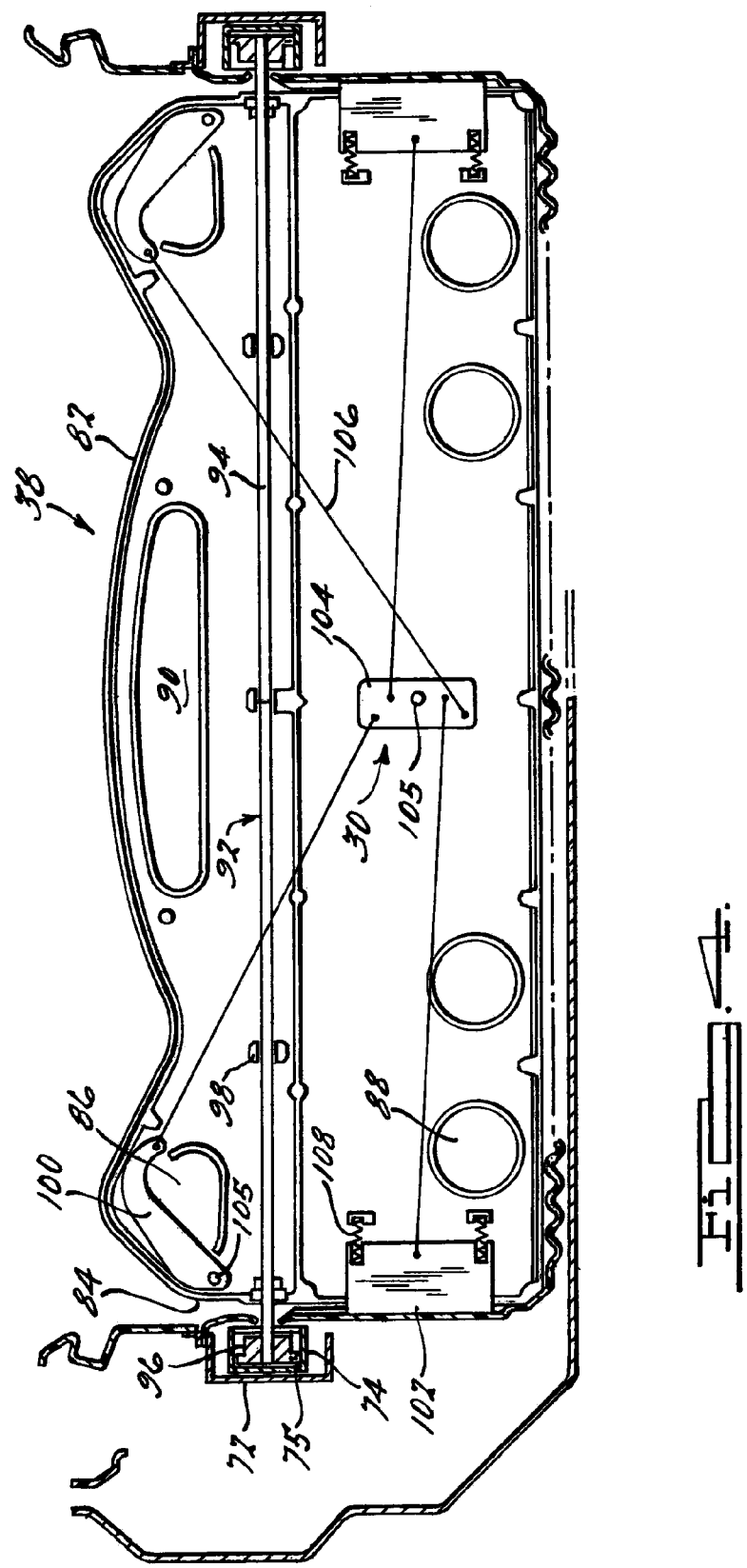
FIG. 4 is an elevational cutaway view of the cargo bed divider panel, according to the present invention.

Referring to FIG. 4, the divider panel 38 includes a pair of generally rectangular panels 82 arranged parallel to each other, and a side panel 84 interconnecting the pair of panels 82. the divider panel 38 includes a positioning mechanism 30, to be described, disposed between the panels 82, 84, for fixedly retaining the divider panel 38 in the inner track 74. The panel 82 may include a cutout handle portion shown at 86 to aid in its repositioning.

In some embodiments of the present invention, the divider panel 38 may be configured so as to be pivotable in the inner track from a position wherein it is generally perpendicular to the floor 12 of the cargo bed assembly 10, to a position wherein it is parallel to the floor 12 so as to provide a table or work surface. In such instances, it may be advantageous to include within the panel 82 an integrally formed feature providing a cup holder, shown at 88. Similarly, panel 82 can be configured to include other features such as slots, as shown at 90, or small diameter openings (not shown) for holding work pieces or the like. Advantageously, manufacturers' logos and the like may also be incorporated into the divider panel 38 (not shown). Most preferably, the divider panel 38 is fabricated from molded polymeric material, although sheet metal, composites and the like may be similarly employed.

In FIG. 4, the divider panel 38 is illustrated in operational relationship to the frame 72 and vehicle. As shown, the divider panel 38 is supported within the inner track 74. The divider panel includes a support means 92 that provides support and movement of the divider panel 38 within the inner track 74. In this example, the support means 92 is a rod 94 extending longitudinally, with a wheel 96 attached to each end of the rod 94. The rod 94 is rotatably supported by the panel 82, such as by a hook 98. Preferably, the wheel 96 includes a gear 95, as is known in the art, for indexing the travel of the wheel 96 in the inner track 72. Advantageously, the indexed rolling motion of each wheel provides for uniform motion of each wheel, and avoids slipping and binding. It should be appreciated that the wheels 96 may include bearings and the like, as is understood in the art, to facilitate the rolling motion of the wheels 96 along the inner track 74.

As further illustrated in FIG. 4, the positioning mechanism 30 associated therewith for fixedly positioning the divider panel 38 is illustrated. Preferably the positioning mechanism 30 is disposed between the panels 82. The positioning mechanism 30 includes a handle 100 disposed within the handle cutout 86 for positioning the divider panel 38. The latching mechanism 30 also includes a stabilizing block 102 extending therethrough an opening in the side panel 84, and operatively connected to the handle 100. In operation, the stabilizing block 102 is rigidly engaged within the indexing groove 36, 50 in the sidewall 18, to fixedly retain the divider panel 38 in a predetermined position. Preferably, there are two opposed stabilizing blocks 102.

In this example, the positioning mechanism 30 includes a center lever 104 that pivots about a fixed point, preferably in the center of the panel 82. The handle 100 is also a lever that pivots about an upper pivot point. It should be appreciated that in this example, there are two handles 100, with each positioned at an upper corner of the panel 82. Further, the center lever 104 and handles 100 are pivotally attached to the panel 82, such as by using a bolt 105. The positioning mechanism 30 further includes a means 106 for interconnecting the center lever 104 with the handles 100, such that in operation depressing the handle 100 actuates the center lever 104 to retract the block 102, so that the divider panel 38 can be repositioned. Preferably, the interconnecting means 106 interconnects a free end of one handle 100 with an end of the center lever 104, and an other end of the center lever 104 with the block 102. Similarly, another interconnecting means 106 connects the other handle 100 with the center lever 104. It is contemplated that the interconnecting means 106 is a rod or wire or the like. The positioning mechanism 30 also includes a biasing spring 108 fixed at one end to the block 102, and at an other end to the panel 92, so as to position and lock the block 102 within the indexing grooves 36, 50.

In operation, depressing one of the handles 100 causes the handle 100 to pivot upwards and the center lever 104 to pivot, which in this example is in the counterclockwise direction, thus retracting the block 102. In this example, depressing either handle 100 will cause both blocks 102 to simultaneously retract, so that the divider panel 38 can be repositioned. In addition, the divider panel 38 rolls along the track 74 at a uniform rate without slipping or binding, since the travel of the wheel 96 within the track 74 is indexed. Advantageously, the operator can reposition the divider panel 38 using one hand.

It is to be understood that the foregoing drawings, discussion and description illustrate particular embodiments of the present invention. Yet other modifications and variations thereof will be readily apparent to one of skill in the art. For example, as mentioned above, the divider panel 38 may be configured so as to be pivotable through at least 90° of rotation. This will provide for ease of access to the cargo compartment, and will permit the divider panel 38 to be used as a worktable, dining table, seating surface or the like. In such instances, folding legs or other such supports may be associated with the divider panel 38. The system of the present invention may be fabricated form a number of materials including metals, polymers, composites and the like. In some preferred embodiments, the frame 72 will be fabricated from high strength engineering polymers such as nylons, reinforced polymers and the like. In other instances, the frame 72 is most preferably fabricated from metal.

Figure 8:
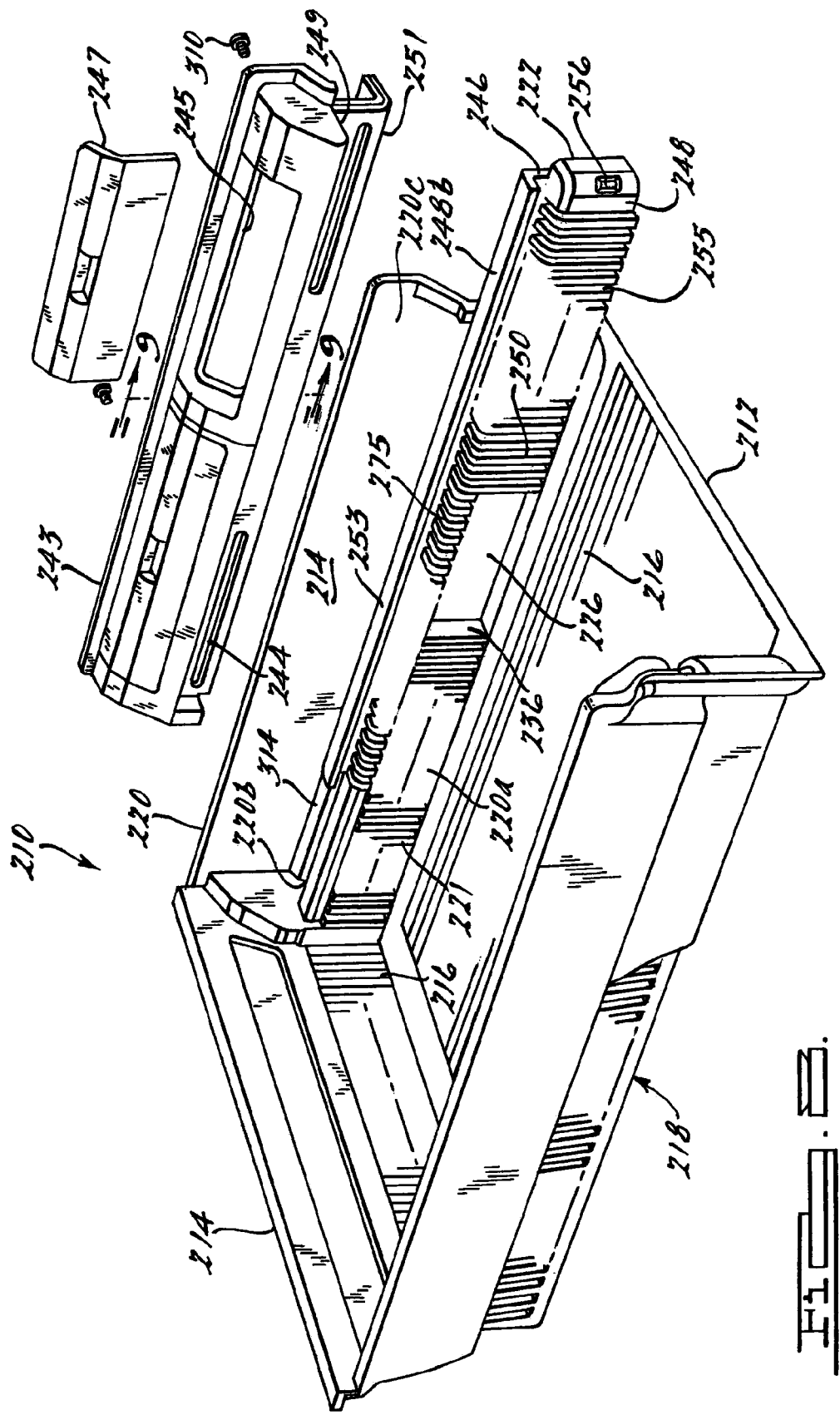
FIG. 8 is a perspective view of another embodiment of a multi-functional cargo bed liner assembly with a sidewall having an integral track, according to the present invention.
Figure 9:
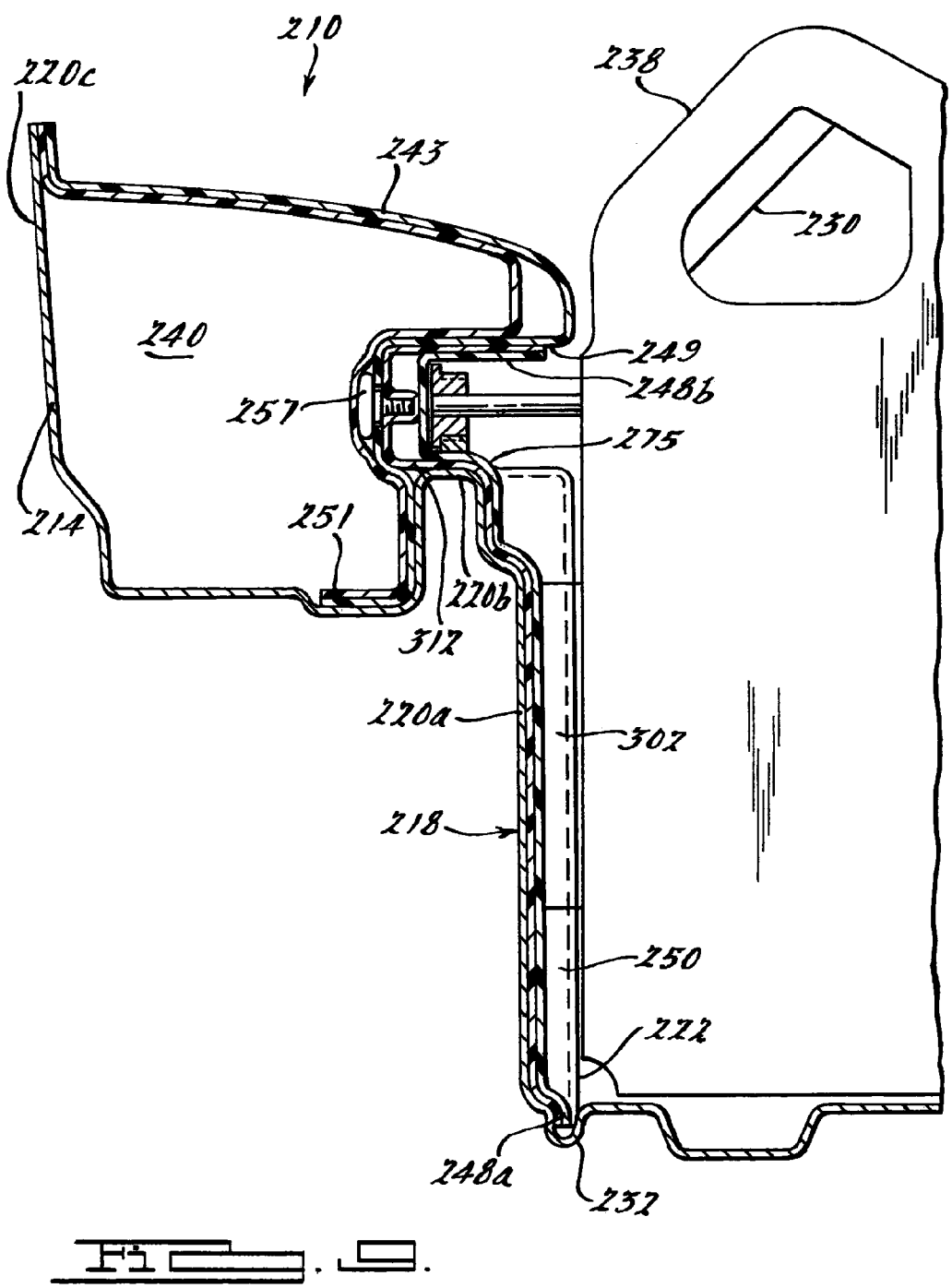
FIG. 9 is a sectional view taken along lines 9—9 of FIG. 8 of the divider panel positioned within integral track, according to the present invention.

Referring to FIGS. 8 and 9, another embodiment of a multifunctional cargo bed liner assembly 210 with an integral track is illustrated. It should be appreciated that like features have like reference numerals increased by 200. In this embodiment, the fixed sidewall includes an integral track 312 for positioning the divider panel 238, and the assembly 210 is self-supporting. The cargo bed liner assembly 210 includes a generally planar floor portion 212, forming the floor of the cargo bed liner assembly 210. The cargo bed liner assembly 210 also includes an end wall 214 extending from an end of the floor 212, adjacent the cab of the vehicle. Preferably, both the floor 212 and end wall 214 include a plurality of integrally formed ribs 216, as previously described. The ribs 216 are spaced a predetermined distance apart, and extend longitudinally. Advantageously, the ribs 216 provide structural support to the floor 212 and end wall 214, respectively.

The cargo bed liner assembly 210 further includes a sidewall 218 extending upwardly from a side edge of the floor 212. In this example, the cargo bed liner assembly 210 includes a first sidewall disposed in a transversely spaced relationship with a second side wall. Each sidewall 218 includes a fixed sidewall 220 and a side extension wall 222 slidably attached to the fixed sidewall 220. It should be appreciated that the fixed sidewall 220 is generally planar, and one side edge of the fixed sidewall 220 is adjacent to the end wall 214.

The fixed sidewall 220 or side extension wall 222 may include an integrally formed feature, such as a depression or boss or the like. For example, the fixed sidewall 220 includes an integrally formed depression, shown at 226, that provides a storage compartment for the cargo bed liner assembly 210, in a manner to be described.

A lower portion of the fixed sidewall 220 includes an integrally formed groove extending longitudinally, to provide a lower track 232 for slidably positioning the side extension wall 222, as previously described. Preferably, the overall length of the lower track 232 corresponds to the distance of travel required for the side extension wall 222. The lower track 232, as well as an upper mating engagement between the fixed sidewall and the side extension wall, allow the side extension walls 222 to slide relative to the fixed sidewalls 220 without the requirement of additional frame/track structure as utilized in the embodiment of FIG. 3. The lower track 232 also includes a portion extending radially a predetermined distance from the lower track 232 to form a locking groove (not shown), for locking the side extension wall 222 in a desired position, as previously described.

The fixed sidewall 220 includes a lower section 220a, an upper section 220c, and a midsection 220b formed therebetween the upper section 220c and the lower section 220a. The lower section 220a includes an indexing portion shown at 221, extending longitudinally there along the fixed sidewall 220 a predetermined length, for indexing the position of a divider panel 238 for the cargo bed liner assembly 210, as previously described. The indexing portion 221 includes a plurality of integrally formed, vertically extending, indexing grooves 236 spaced a predetermined distance apart. The lower section 220a of the fixed sidewall 20 also includes an integrally formed depression 226, which preferably conforms with the shape of the wheel well portion of the vehicle cargo bed.

The midsection 220b of the fixed sidewall 220 includes an integrally formed channel 314 extending longitudinally between the upper section 220c and the lower section 220a of the fixed sidewall 220. The channel 314 is oriented on a horizontal plane between the upper section 220c and the lower section 220a. Preferably, the channel 314 is U-shaped.

The upper section 220c of the fixed sidewall 220 advantageously provides a storage area, as shown at 240 for storing items within the cargo bed liner assembly. The upper section 220c of the fixed sidewall 220 includes a generally planar back wall 214, and a separable front wall 243. The back wall 214 extends upwardly from the midsection 220b of the fixed sidewall 220. Preferably, the back wall 214 is molded to conform with vehicles having sidewalls of various shapes. The front wall 243 includes an access opening shown at 245 for providing access into or out of the storage area 240. Preferably, a door 247 covers the access opening 245, and articulates to provide ingress and egress to the storage area 240.

In addition, a lower edge of the front wall 243 forms a lip 249. The front wall 243 also includes a longitudinally extending flange 251 extending downwardly from an edge of the lip 249, and having an "L" shape. The lip 249 and flange 251 cooperating form a portion of the integral guide track 312 for guiding the movement of the divider panel. The vertical extending face of the flange 251 includes a longitudinally extending slot 244 for positioning the side extension wall 222 relative to the fixed wall 220 in a manner to be described. The front wall 243 and rear wall 241 are joined together to form an integral structure.

Advantageously, the side extension wall 222 increases the overall length of the cargo bed of the vehicle. It is contemplated that the side extension wall 222 may be formed as a single panel, or an assembly. In this example, the side extension wall 222 is an assembly and includes an inner panel 246 joined to an outer panel, 248 to form a unitary wall, having a box-like shape, as previously described.

The outer panel 248 is a generally planar member, and includes a forward section 253 and a rearward section 255. The forward section 253 is a partial wall, and does not extend all the way to the floor 212 of the cargo bed liner assembly 210. The rearward section 255 is a full wall and extends all the way to the floor 212 of the cargo bed liner assembly 210. The rearward section 255 includes a lower flange 248a extending from a lower edge that forms a lower guide for the side extension wall 222 in the lower track 232 in the fixed sidewall 220.

The side extension wall 222 also includes an upper flange 248b extending from an upper edge, that forms an upper guide for the side extension wall 222 with respect to the fixed sidewall 220. In this embodiment, the upper flange 248b has an inverted "L" shape. The upper flange 248b includes at least one outwardly projecting guide means 257 disposed therein. An example of a guide means 257 is a fastener, such as a bolt or screw or the like, although other types of guides are contemplated. The guide means 257 includes a head portion that is movably engaged within the guide slot 244 in the securing flange 251. In operation, the guide means 257 travels within the guide slot 244 to locate and position the side extension wall 222 relative to the fixed wall 220.

The outer panel 248 further includes a plurality of vertically extending indexing grooves 250 spaced a predetermined distance apart, similar to the grooves 236 in the fixed sidewall 220, for positioning the divider panel 238. It should be appreciated that an upper end of the indexing grooves forms a gear track 275 for indexing the position of the divider panel, while the vertically extending depression between consecutive indexing grooves 250 lock in the indexed position of the divider panel 238.

Preferably, the outer panel 248 includes a cutaway portion (not shown) for removing the divider panel 238 from the cargo bed liner assembly 210 in a similar manner as previously described.

The inner panel 246 is also a generally planar member, and provides a rear wall and structural support to the side extension wall 220. Advantageously, the inner panel 246 and outer panel 248 can be formed and joined as one using a conventional technique, such as blow molding. The side extension panel further includes a locking mechanism 256, as previously described.

It should be appreciated that when assembled together, the flange 251 of the front wall 243 and upper flange 248b of the outer panel 248 of the side extension wall 222 and gear track 275 form an integral track 312 for indexing the position of the divider panel 238.

The cargo bed liner assembly 210 further includes a divider panel 238 and a positioning mechanism 230 for the divider panel 238, as previously described. The cargo bed liner assembly 210 also includes a tailgate panel fixedly attached to the tailgate (not shown) of the vehicle, as previously described.

The cargo bed liner assembly 210 with integral track 312 operates in a similar manner as previously described for the cargo bed liner assembly of FIG. 1. The guide means 257 for the side extension wall 222 extends therethrough the guide slot 244 in the flange 251 in the front wall 243 of the fixed sidewall 218. The locking mechanism 256 is operated to position the side extension wall 222 relative to the fixed sidewall 220. The divider panel 238 is positioned by depressing the handle 300 to retract the stabilizing block 302, moving the divider panel 238 along the track 312 to the desired position. Advantageously, the travel of the divider panel 238 within the integral track 312 is indexed, to avoid slipping or binding of the divider panel 238 as it is positioned. The handle 300 is released, such that the block 302 is fittingly retained within the indexing grooves 236 or 250.

Advantageously, the cargo bed liner assembly 210 is self-supporting, and is removably attached to the vehicle using an attaching means 310. An example of an attaching means 310 is a fastener such as a bolt, screw or hook or the like. Advantageously, this embodiment of the cargo bed liner assembly 210 does not utilize frame for support, and includes an integral track 312.

Figure 10:
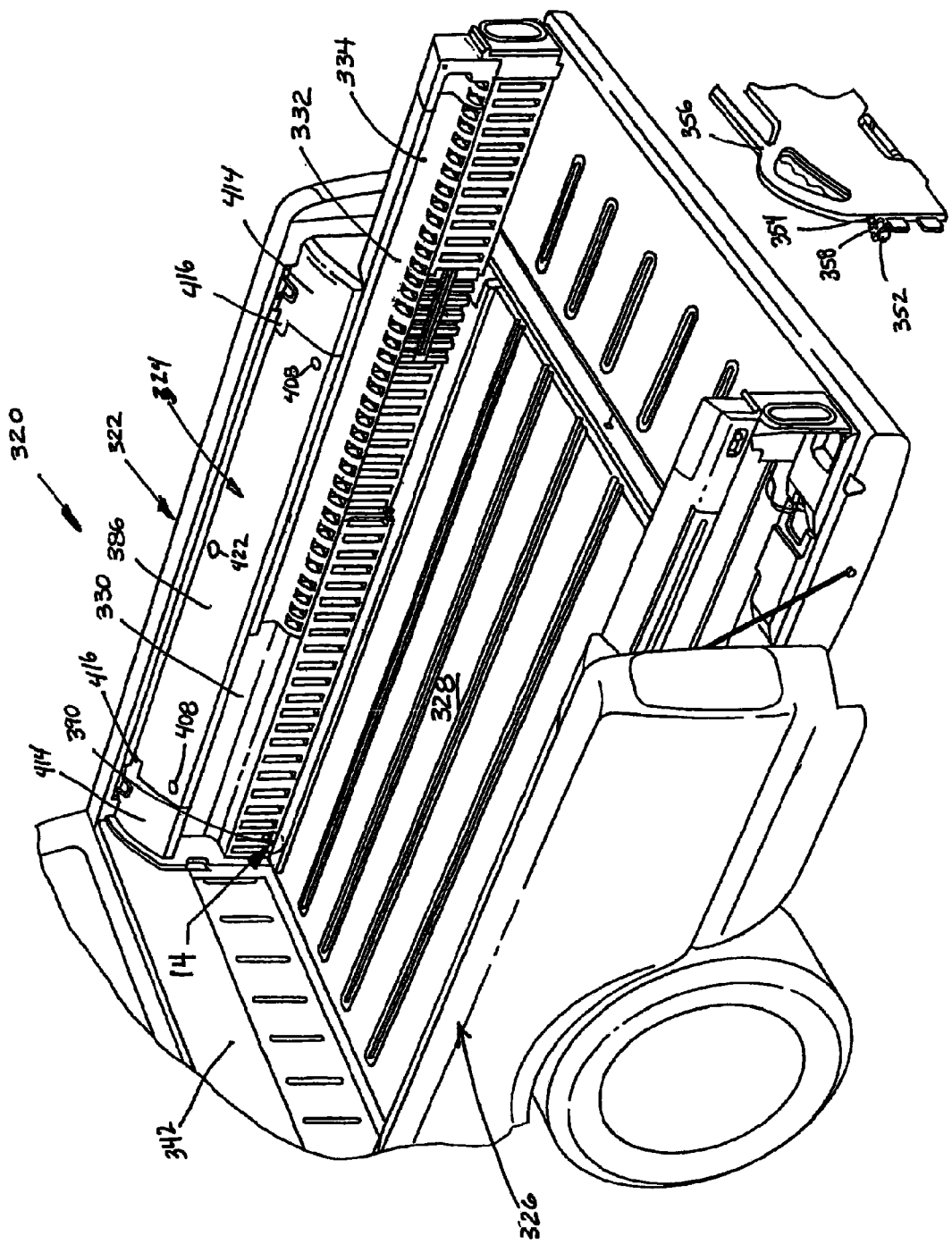
FIG. 10 is a perspective view of a multi-functional cargo area for a vehicle having extendable sidewalls and a movable divider panel according to the principles of the present invention.
Figure 11:
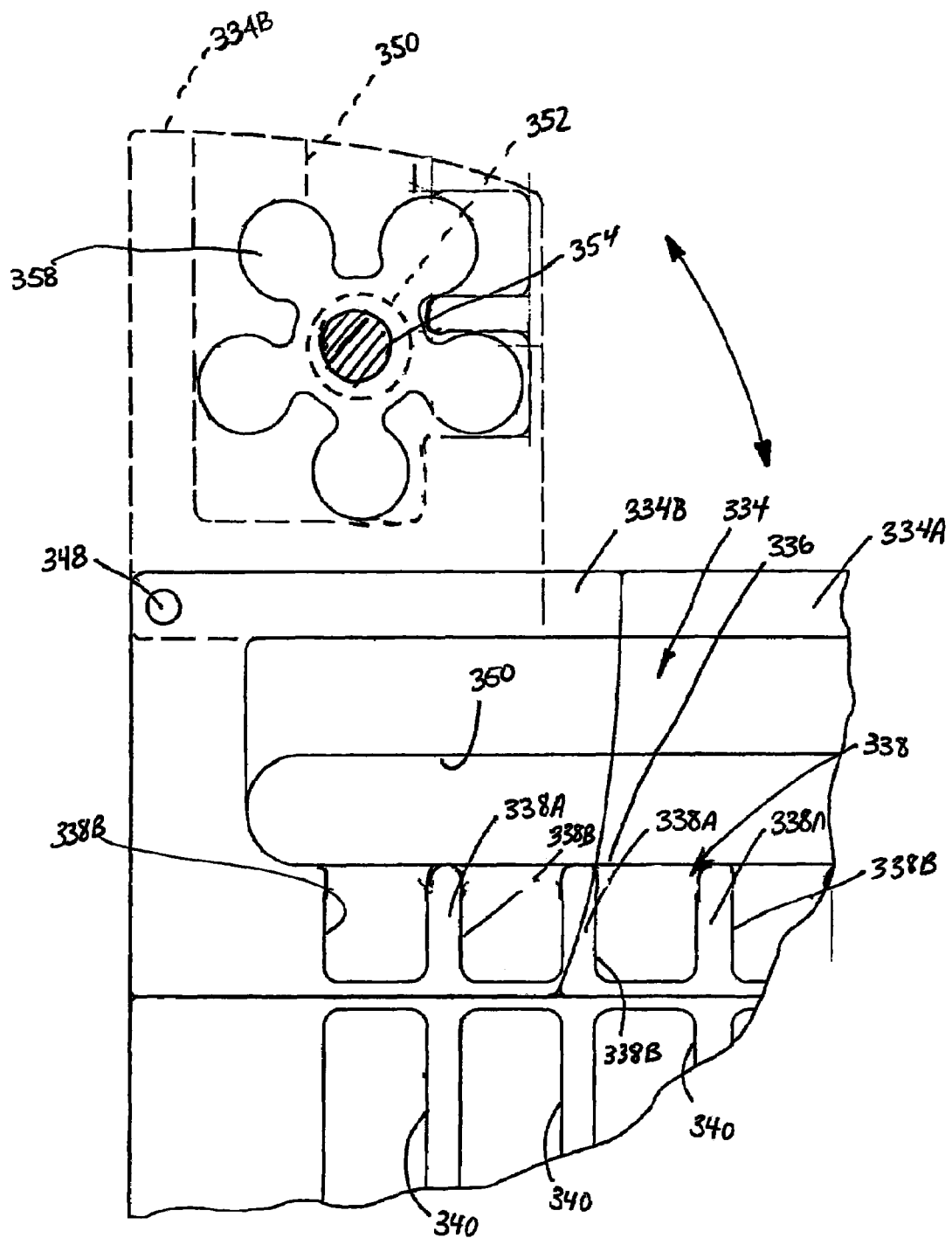
FIG. 11 is a detailed plan view illustrating a pivoting rail portion which is pivotable for receiving a roller/pinion of a divider panel according to the principles of the present invention.

With reference to FIG. 10, a vehicle 320 such as a pick-up truck is provided with a cargo area 322 including a first sidewall 324 and a second sidewall 326 disposed in a generally transverse relationship. A floor 328 extends between the sidewalls 324, 326. The sidewalls 324, 326 each include a fixed sidewall portion 330 and a side extension wall portion 332 which is slidably movable relative to the fixed sidewall portion 330. As best shown in FIG. 11, the sidewalls 324, 326 each include an integrally formed guide rail 334 formed in the extension wall portion 332. The guide rail 334 includes a roller track portion 336 and a gear track portion 338 with raised gear teeth portions 338A disposed between recessed gear portions 338B. Indexing grooves 340 are provided along the vertical sidewalls. A front wall panel 342 extends between the sidewalls 324, 326 and a tailgate panel 344 is provided on the interior surface of the tailgate 346.

As illustrated in FIG. 11, the guide rail 334 includes a first rail portion 334A disposed generally horizontally and a pivoting rail portion 334B pivotably attached to the side extension wall 332 by a pivot 348. The pivoting rail portion 334B is disposed at the end of the guide rail 334. The pivoting rail portion includes a slot 350 defining a portion of the roller track portion 336. The pivoting rail portion 334B is pivotable as illustrated in phantom in FIG. 11 to receive a roller 352 disposed at an end of a support rod 354 provided on a movable divider panel 356 (best shown in FIG. 10). The pivoting rail portion 334B also includes gear teeth portions 338A and recessed gear portions 338B for meshingly engaging with a gear wheel 358 disposed on the support rod 354. When the pivoting rail portion 334B is pivoted to the vertical position (as illustrated in phantom), the support rod 354 can be inserted at each end into the vertical slot 350 and properly aligned. The pivoting rail portion 334B is then pivoted to the horizontal position in alignment with the roller track portion 336 so that the support rod 354 is properly aligned and loaded at each end without the possibility of misalignment of gear wheel 358 with the gear track portions 338 on each sidewall.

Figure 12:
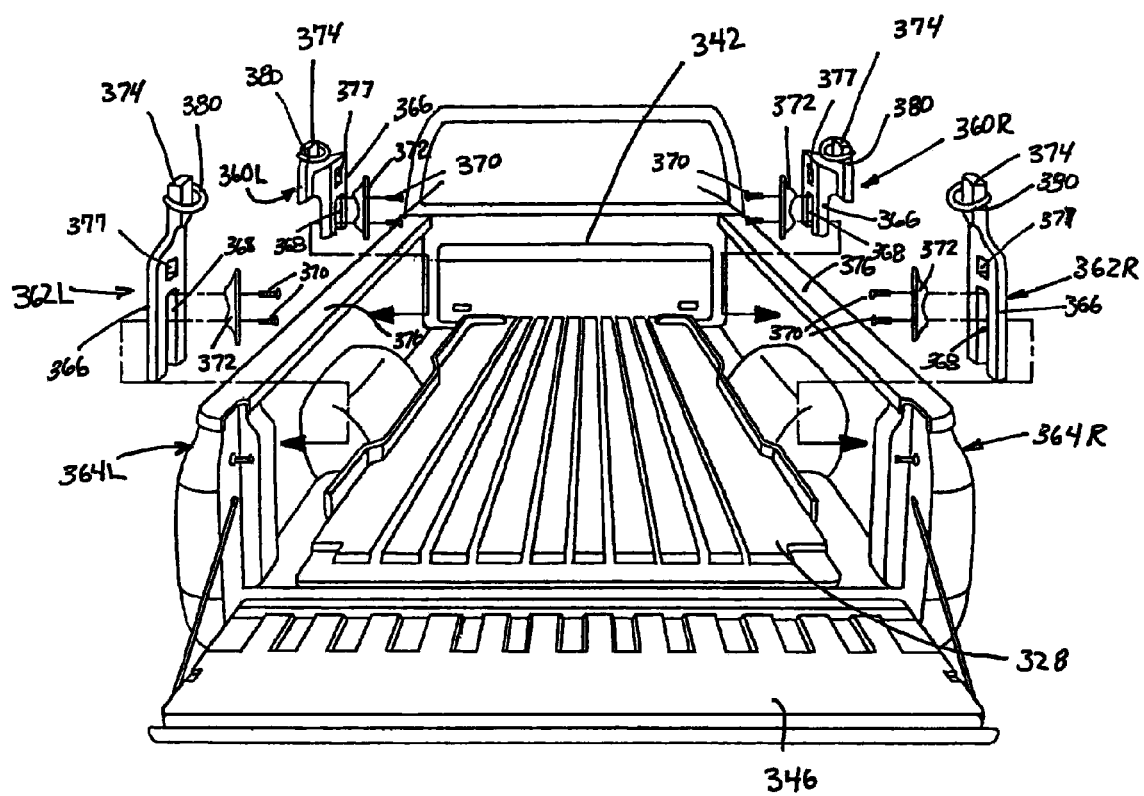
FIG. 12 is an exploded perspective view of a truck bed and mounting brackets according to the principles of the present invention.

With reference to FIG. 12, during assembly of the cargo bed assembly, a pair of front mounting brackets 360L, 360R and a pair of rear mounting brackets 362L, 362R are mounted to the truck bed sidewalls 364L, 364R, respectively. Each of the mounting brackets 360L, 360R, 362L, 362R include a base portion 366 with a first mounting feature 368 for mounting the brackets 360L, 360R, 362L, 362R to the sidewalls 364L, 364R by, for example, threaded fasteners 370. According to a preferred embodiment, existing tie down members 372 can be used along with threaded fasteners 370 for mounting the mounting brackets 360L, 360R, 362L, 362R to the sidewalls 364L, 364R of the truck bed. For this purpose, the mounting brackets 360L, 360R, 362L, 362R, each include recessed portions in the vicinity of the mounting features 368 in order to receive the tie down members therein.

Each of the mounting brackets 360L, 360R, 362L, 362R includes an upper arm portion 374 extending from the base portion 366. The upper arm portions 374 are adapted to be inserted under an upper up 376 of the sidewalls 364L, 364R of the truck bed. The mounting brackets 360L, 360R, 362L, 362R each include a cargo hook 380 pivotally mounted at an upper end of the upper arm portions 374. The mounting brackets 360L, 360R, 362L, 362R each include a second mounting feature 377 which includes a threaded aperture for receiving a bolt 378 (best illustrated in FIG. 13) for securing the sidewall panels 324, 326 to the sidewalls 364L, 364R of the truck bed. Bolts 378 preferably include a hand grip portion 382 to facilitate easy handling of the bolt within the side panels 324, 326 for engagement with the second mounting feature 377 of the mounting brackets.

Figure 13:
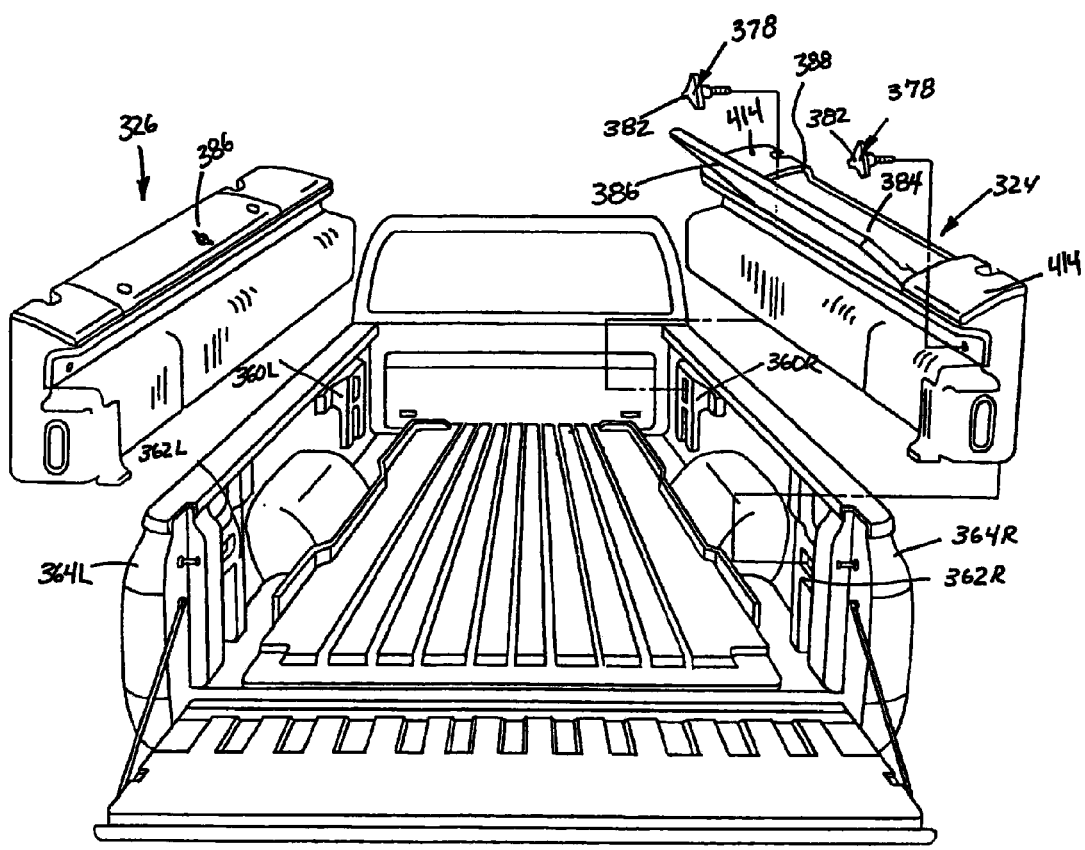
FIG. 13 is an exploded perspective view of a vehicle truck bed illustrating sidewall storage bins being assembled therein.
Figure 14:
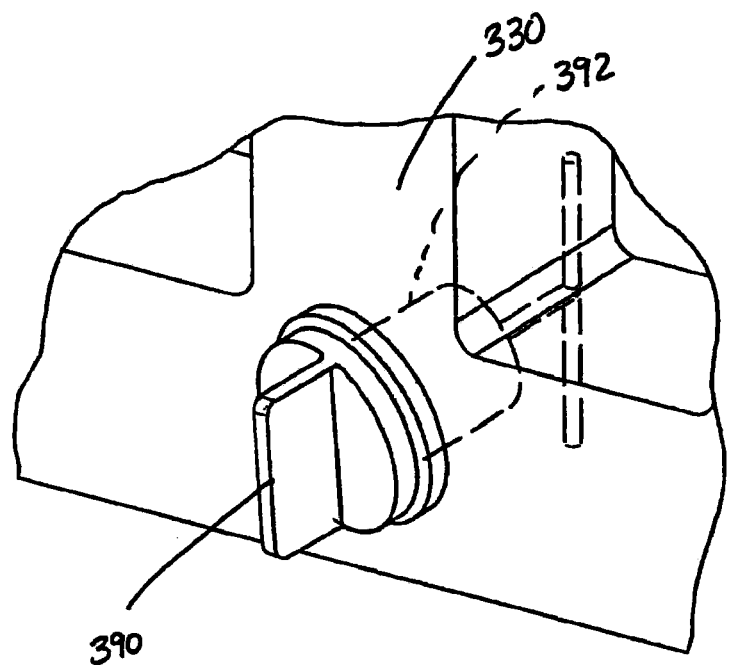
FIG. 14 is a detailed perspective view of a removable drain plug provided in the storage pins according to the principles of the present invention.

With reference to FIGS. 10, 13, and 14, the fixed sidewall portions 330 of the sidewalls 324, 326 each include a storage bin defining a cavity 384 for storing tools and other items therein. A lid 386 is provided for covering an opening 388 in the sidewalls for access to the cavity 384. As illustrated in FIGS. 10 and 14, a removable plug 390 is provided in a bottom portion of the cavity 388 so that fluid within the cavity 388 can be drained therefrom. The storage bin defined by the sidewalls can therefore be used as a cooler for receiving ice and food or beverages, and can be easily drained by removal of the drain plug 390. The drain plug can be threadedly received in aperture 392 provided in the storage bin.

Figure 15:
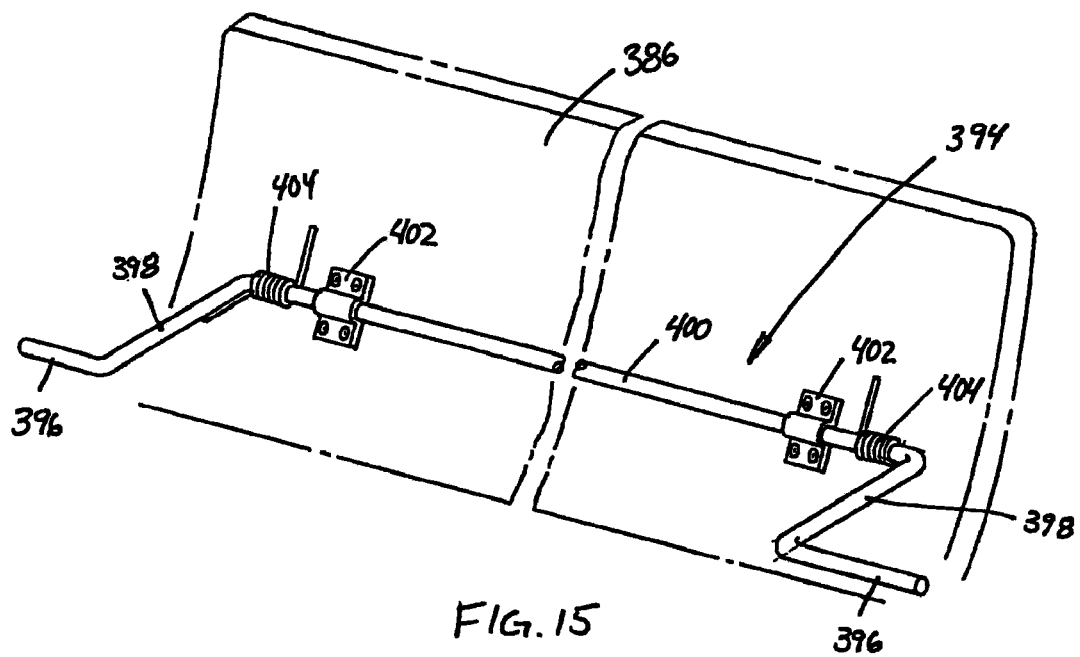
FIG. 15 is a perspective view of a lid member for the storage bins including a hinge mechanism according to the principles of the present invention.
Figure 16:
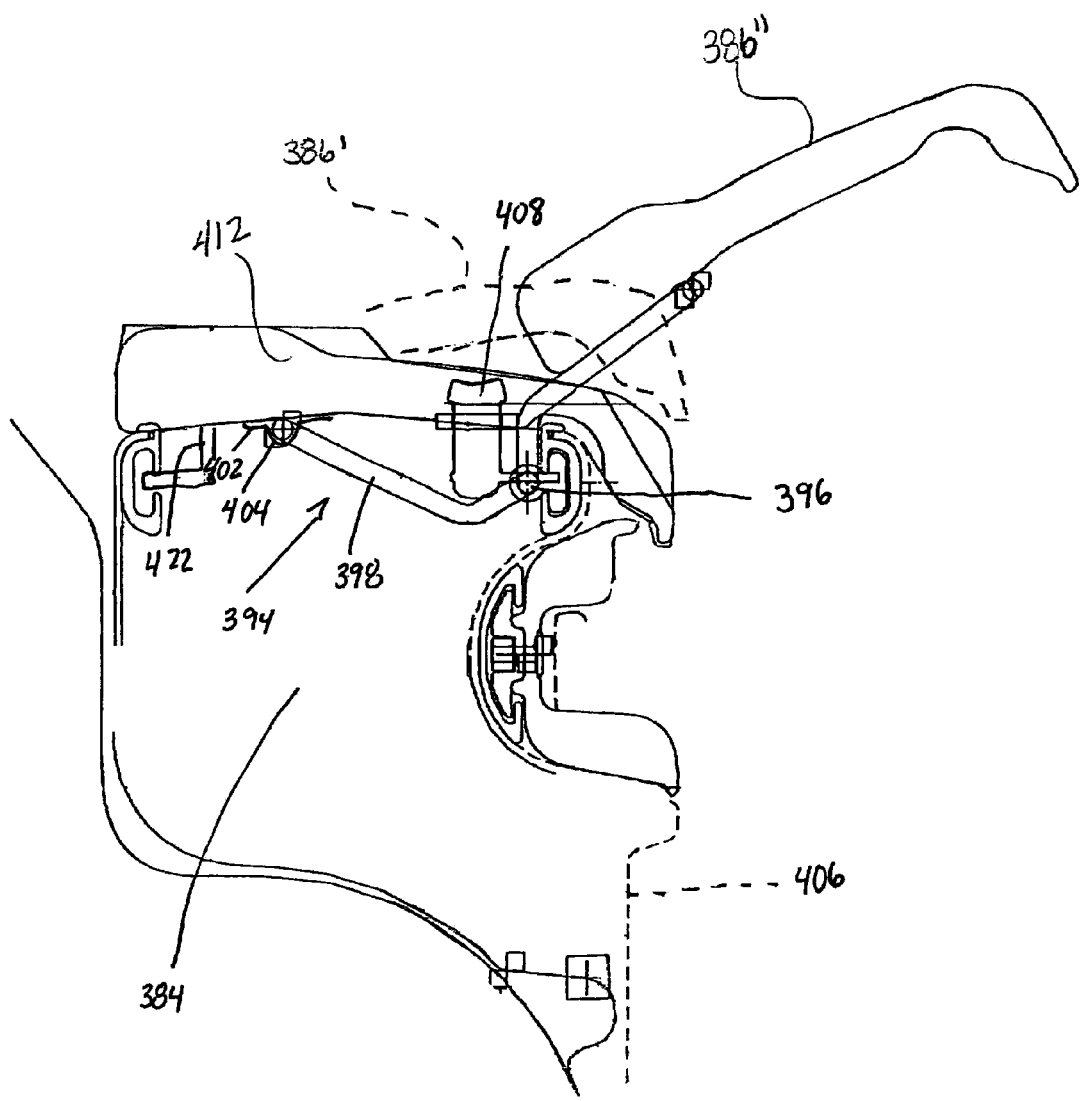
FIG. 16 is a cross-sectional view of the storage pin and lid member showing the lid member being moved from a closed to an open position.

With reference to FIGS. 15 and 16, the lid 386 is attached to the storage bin portion of the sidewalls 324, 326 by a hinge mechanism 394. The hinge mechanism 394 includes a pair of spaced pivot arms 396 rotatably attached on opposite sides of the opening 388 in the storage bin. A pair of swing arms 398 extend at approximately a right angle, although other angles can be utilized, from the pivot arms 396. A cross bar 400 is connected between the ends of the swing arms 398. The lid 386 is pivotally attached to the cross bar 400 by pivot brackets 402 which are fixedly mounted to the lid 386 and which rotatably receive the cross bar 400 therein. A pair of torsion springs 404 are provided on the cross bar 400 for rotatably biasing the lid 386 upwardly away from the inboard sidewall 406 of the storage bin, as best illustrated in FIG. 16.

Upon release of the latch mechanism 408 from latch receptor 410, the torsion springs 404 raise the lid 386 to the position shown as indicated by reference numeral 386'. The spring bias of the torsion springs 404 raises the inner edge 412 of the lid 386 to provided clearance from a movable divider panel which may be disposed adjacent to the lid 386. At this time, the lid in position 386' can be lifted to the position represented by reference numeral 386" in FIG. 16 in order to provide open access through the opening 388 to the interior cavity of the storage bin.

Figure 17:
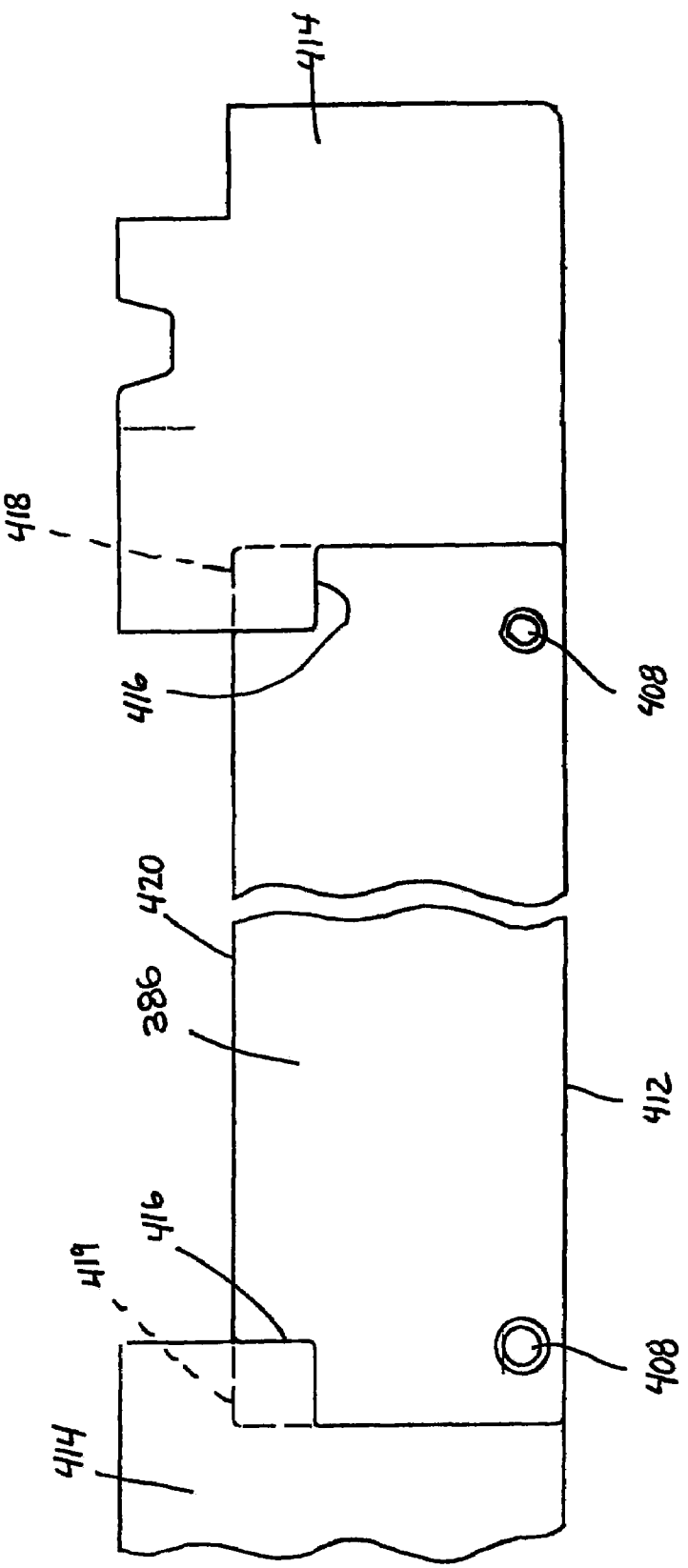
FIG. 17 is a plan view of the lid member and end caps provided at the top of the storage bin according to the principles of the present invention.

As illustrated in FIG. 17, the storage bins include a pair of end cap portions 414 covering opposite end portions of the opening 388 in the storage bin on opposite sides of the lid 386. End caps 414 each include finger portions 416 which overlap recessed portions 418 provided at opposite ends of the lid 386. The fingers 416 retain the outboard edge 420 of the lid 386 in a down position when the latch mechanisms 408 are released and the inboard edge 412 of the lid 386 is pivoted upward by the biasing force of the torsion springs 404. As illustrated in FIG. 16, a lock member 422 is provided for locking the lid 386 in a closed position. It is anticipated that lock 422 would require a key in order to disengage the lock 422 in order to allow opening of the lid 386.

Figure 18:
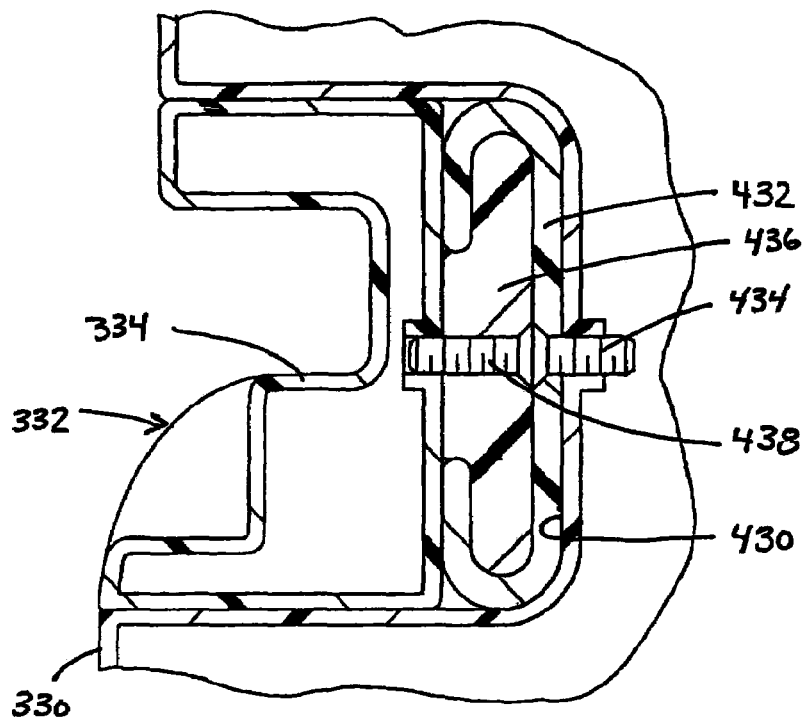
FIG. 18 is a cross-sectional view of the guide rail structure for the extending sidewall portion according to the principles of the present invention.
Figure 19:
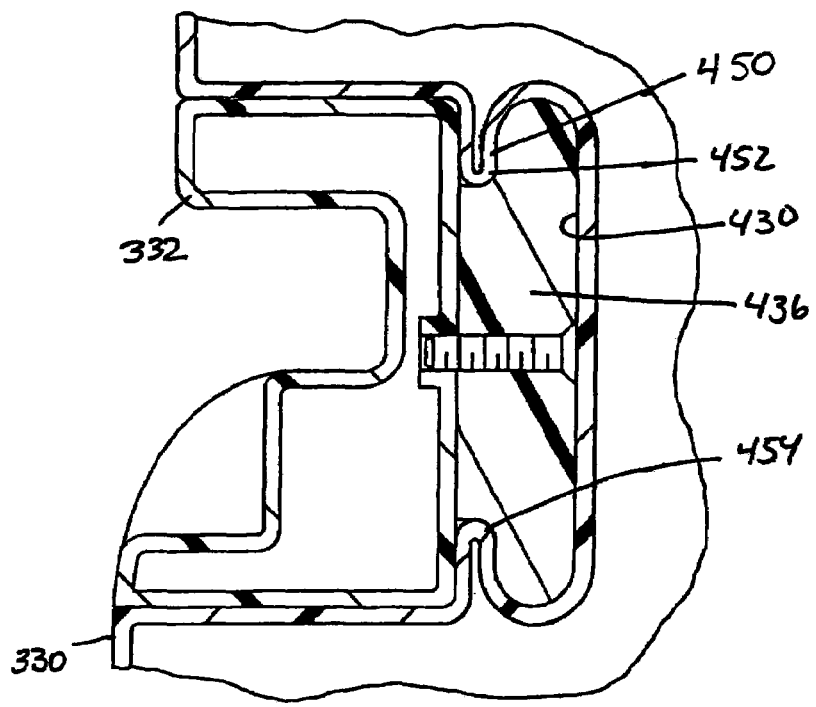
FIG. 19 is a cross-sectional view of an alternative guide rail structure for the extending sidewall portion according to the principles of the present invention.

With reference to FIG. 18, the fixed sidewall portions 330 include a recess 430 for slidably receiving the guide rail portion 334 of the side extension wall portions 332. An elongated guide rail 432 is mounted within the recess 430. The elongated guide rail 432 is an extruded member preferably formed from plastic or aluminum which is fastened to the recess 430 by screws 434 or other fasteners. The elongated guide rail preferably has a C-shaped cross section. A plurality of slide members 436 are fastened to the side extension walls 332 such as by fasteners 438. The slide members 436 are received in the guide rail 432 to allow sliding movement of the side extension walls 332 relative to the fixed sidewall portions 330. According to an alternative embodiment, the elongated guide rail portion 432 can be formed integrally with the recess 430 of the fixed sidewall portion 330. As illustrated in FIG. 19, the integrally formed guide rail 450 is provided with upper and lower ribs 452, 454 which engage slide members 436 for allowing sliding engagement between the side extension wall portion 332 and fixed sidewall 330.

Many modifications and variations of the present invention are possible in light of the above teachings. Therefore, within the scope of the appended claims, the present invention may be practiced other than as specifically described.

What is claimed is:

1. A cargo area for a truck bed, comprising:
   a plurality of mounting brackets each including a base portion with a first mounting feature for securing said mounting bracket to the truck bed, said base portion including a second mounting feature, said mounting brackets including an upper arm portion extending from said base portion and adapted to be inserted under an upper lip of a sidewall of the truck bed;
   a pair of sidewall panels extending along the sidewalls of the truck bed and each secured to said second mounting feature of at least two of said mounting brackets.

2. The cargo area according to claim 1, wherein said second mounting feature includes a threaded aperture for receiving a bolt for securing said sidewall panels to said mounting bracket.

3. The cargo area according to claim 1, further comprising a cargo hook disposed on said upper arm portion of at least one of said plurality of mounting brackets.

4. A storage system for a pick-up truck, comprising:
   a bin including a first sidewall, a second sidewall and a base extending between a bottom portion of said first sidewall and a bottom portion of said second sidewall, an opening provided between a top of said first sidewall and said second sidewall;
   a lid attached to said bin by a hinge mechanism, said hinge mechanism including a pair of spaced pivot arms rotatably attached to said bin, a pair of swing arms each extending at an angle from a respective one of said pivot arms, and a cross bar connected between said pair of swing arms, said lid being pivotally attached to said cross bar, said lid being movable between a closed position and an open position; and a spring device engaging said lid for rotatably biasing said lid away from said first sidewall.

5. The storage system according to claim 4, wherein said swing arms are pivotable to move said lid away from said second sidewall.

6. The storage system according to claim 4, further comprising a pair of end cap members covering opposite end portions of said opening on opposite sides of said lid.

7. The storage system according to claim 6, wherein said end cap members overlap a portion of said lid when said lid is in said closed position.

8. A cargo area of a vehicle comprising:

a first side wall and a second side wall disposed in a transversely spaced relationship, and a floor extending between said first and second side walls;

said first and second side walls further comprise first and second fixed side wall portions and first and second side extension walls slidably attached to said first and second fixed side wall portions, respectively, by a slide mechanism including an elongated guide rail attached to each of said fixed side wall portions and engaged with a slide member attached to each of said side extension walls, wherein said first and second side extension walls and said first and second fixed side wall portions each include a guide track, and further including a movable divider panel extending between said first sidewall and said second sidewall and engaging said guide tracks in said first and second extension walls and said first and second fixed side walls portions.

* * * * *